United States Patent [19]
Benjamin et al.

[11] Patent Number: 6,036,051
[45] Date of Patent: Mar. 14, 2000

[54] FISH HOOK DISPENSER

[76] Inventors: Ronald Garth Benjamin, 24345 Osprey, Lake Forest, Calif. 92630; Jon Vincent Lee, 13752 Gershon Pl., Santa Ana, Calif. 92705

[21] Appl. No.: 09/118,531
[22] Filed: Jul. 17, 1998

Related U.S. Application Data

[60] Provisional application No. 60/053,269, Jul. 21, 1997.
[51] Int. Cl.⁷ ................................................. A01C 13/30
[52] U.S. Cl. ............................................. 221/185; 43/57.1
[58] Field of Search .................................. 221/185, 303, 221/282, 1, 33, 47; 43/4, 57.1

[56] References Cited

U.S. PATENT DOCUMENTS 4,414,771  11/1983  Martin ............................................. 43/4

*Primary Examiner*—Kenneth W. Noland

[57] ABSTRACT

Apparatus which utilizes the eyelet of a fish hook as the primary means of retaining, storing and dispensing at least one fish hook. The invention integrates mechanically with the structure of the fish hook to limit travel upon the apparatus such that the points of the hooks are continuously covered and the hooks are securely retained regardless of the orientation of the apparatus, until intentionally accessed by a user, thus preventing spillage during change in orientation of the apparatus or when accidentally dropped. The apparatus is intended to be worn external to the person, thus minimizing access time and physical motions needed to obtain a fish hook when needed. Fish hooks retained upon the invention may be rinsed as a group, and the open ends vinyl cover integrated into the apparatus are spaced to allow for natural air circulation upon the hooks to aid in drying after immersion, thus reducing the risk of the hooks being affected by corrosion.

1 Claim, 2 Drawing Sheets

FISH HOOK DISPENSER

CROSS-REFERENCE TO RELATED APPLICATIONS

We hereby claim the benefit of the filing date of our provisional patent application No. 60/053,269; filing date Jul. 21, 1997, Title: Fish Hook/Tackle Storage Device.

BACKGROUND OF THE INVENTION

The invention provides to fishermen very rapid and convenient access to single fish hooks (as distinguished from double or treble hooks), while simultaneously meeting a fisherman's need to be protected from the hazards inherent to fish hooks, such as puncture wounds and snagging on clothing. It also provides an alternative to other known hook storage methods. The invention is designed to be worn on the person, through attachment to a shirt or coat button, a safety pin, or similar means, or to a lanyard or string which is either suspended from around the neck or tied to clothing. It will simultaneously store several sizes of hooks if such is desired, or store a uniform size and shape of hook. Because the package is essentially flat, several may be easily stored in a single pocket, providing the fisherman to quickly switch to a supply of hooks of a different size or style as fishing conditions or opportunities change. The invention substantially eliminates the numerous inconveniences inherent to known fish hook storage mechanisms, such as hook spillage and loss, and hook corrosion due to entrapment of moisture. It also greatly reduces access time and the amount of body movement required to access hooks. Finally, once the hooks are manually accessed and slipped off of the storage arm of the apparatus, it is held by the fingers in an acceptable position for threading through with fishing line by the opposite hand. This differs from known forms of storage, from which hooks are grasped at random orientations and must usually be maneuvered and repositioned into an orientation suitable for threading through with the line. The need to access individual fish hooks is related to a particular type of fishing, known as bait fishing. Bait of various types are simply affixed to a hook and cast into the water. When circumstances require that another hook be tied to the line to continue fishing, such as the breaking of the line, or the need to change the size of the hook to adapt to different bait or different species being targeted, ready access to hooks is of great benefit to the fisherman. This is particularly true in ocean fishing situations during which schools of fish are encountered only for a very brief period of time and ready access to another hook to tie onto the line following hook loss due to, for example, line breakage or knot slippage, may translate into more fish catching opportunities.

Loose fish hooks are packaged for retail sale and stored for use in very few known ways. Clear rectangular plastic boxes with snap-latch lids are commonly used but allow the hooks to be spilled if dropped when the lid is open, and restrict the escape of moisture following immersion, promoting conditions which lead to corrosion of the hooks. When fishermen need to access hooks stored in a plastic box, they must reach into a pocket, open the box, grasp a hook, close the box, and replace the box into the pocket. This is a time-consuming task which reduces the amount of time a person spends actually fishing. In addition, some of these boxes are very difficult to open. Hooks stored in such boxes may furthermore become tangled and cause more than one hook to be removed. On occasion open boxes containing hooks are mishandled and dropped, causing the entire contents to spill out. If this occurs on sand or water, some or all of the hooks may be lost. Hook boxes trap moisture and can promote the corrosion of the entire content of the box following the reintroduction of wet hooks. Finally, fish hook boxes cannot be worn on an outer garment to overcome the inconvenience of access from a pocket.

Fish hooks are also commonly sold and stored in heat-fused vinyl cases and plastic reclosable-top bags. Hooks stored in this way are accessed by reaching with the fingers into the case or bag, exposing them to the risk of puncture wounds, or by tipping the contents out. An addition, this technique is slow, and also occasionally produces more than the single hook sought by the user. Similar to the hook box, closed hook bags also tend to trap moisture when wet hooks are reintroduced to them, resulting in conditions which lead to rusted hooks.

Tacklebox compartment storage of loose hooks is also common. However, when movement to the tacklebox is inconvenient, or where use of a tacklebox is incompatible with the fishing situation, fishermen must rely on an alternative source for hook access.

The access problems described above are aggravated by adverse fishing conditions, such as rain, cold, and low light, and challenging fishing environments such as exposed rocks and jetties, coastal surf, and shallow water wading.

The invention was created to provide an alternative to the conventional style of hook containers and overcomes aforementioned limitations inherent to them.

Since fishing is an extremely popular and common form of recreation, as well as a form of livelihood, it is not surprising that several proposals have been advanced with the intent of increasing fishing efficiency and productivity.

U.S. Pat. No. 4,414,771, issued Nov. 15, 1983, discloses a mechanism for the dispensing of fish hooks by means of a spring mechanism within a magazine. The eyelets of the hooks are exposed in this device, with the intent that the fisherman will complete the knot tying the next hook to be dispensed, while the hook is still retained within the dispenser. Each dispenser mechanism under the aforementioned patent number is limited to a single hook size, and allows for a limited number of knot-tying options to enable the practical use of the device. Other mechanisms, notably U.S. Pat. Nos. 2,717,470 and 3,540,143 present the eyelet of the hooks for threading through with fishing line prior to dispensing, and then releasing the hook prior to the completion of the knot.

SUMMARY OF THE INVENTION

The invention uses a completely different approach to the safe storage of and rapid user access to a plurality of fish hooks. The invention consists of a retainer/dispenser component which is routed through and wrapped by a semi-rigid vinyl sheet. Each hook to be stored on the device is threaded onto a retainer/dispenser component utilizing the circular eyelet of each hook. The hooks stored in this way hang by gravity within the apparatus, which is intended to be worn external to the person of the user. This ability of the user to wear the apparatus is intended to overcome the disadvantage of forcing the user to search pockets, or to return to the location of a tacklebox, for the sole purpose of obtaining a fish hook. While the wearer is directly protected from the sharp points by the vinyl covering, the hook points are further prevented from being exposed by limit stops incorporated into the apparatus, which constrains their travel and rotation such that they are unable to rotate upon on the retainer/dispenser component with both sides of the vinyl cover in place, or to swing upon this component of the apparatus in a way which would allow their points to be exposed from beneath the vinyl covering. The same limit stop which prevents the escape of the hooks from the open terminus of the retention/dispenser component also acts, by virtue of its shape, to facilitate the motion of the wrist necessary to remove a hook from the apparatus when such is the intention of the user. The design of the apparatus also facilitates the rinsing and drying of a group of stored fish hooks following exposure to corrosive environmental elements.

Accordingly, the object of the invention is to provide a new apparatus which retains and dispenses fish hooks in manner optimized for rapid and efficient accessibility to the user.

Another object of the invention is to provide a method for retaining and storing fish hooks in a safe and spill resistant manner.

Yet another object of the invention is to provide a method and apparatus which increases the convenience of rinsing and drying fish hooks as a group, thus preventing the waste of such hooks due to the adverse effects of corrosion upon strength and sharpness of the hooks.

DETAILED DESCRIPTION

Figures 1, 2, 3:
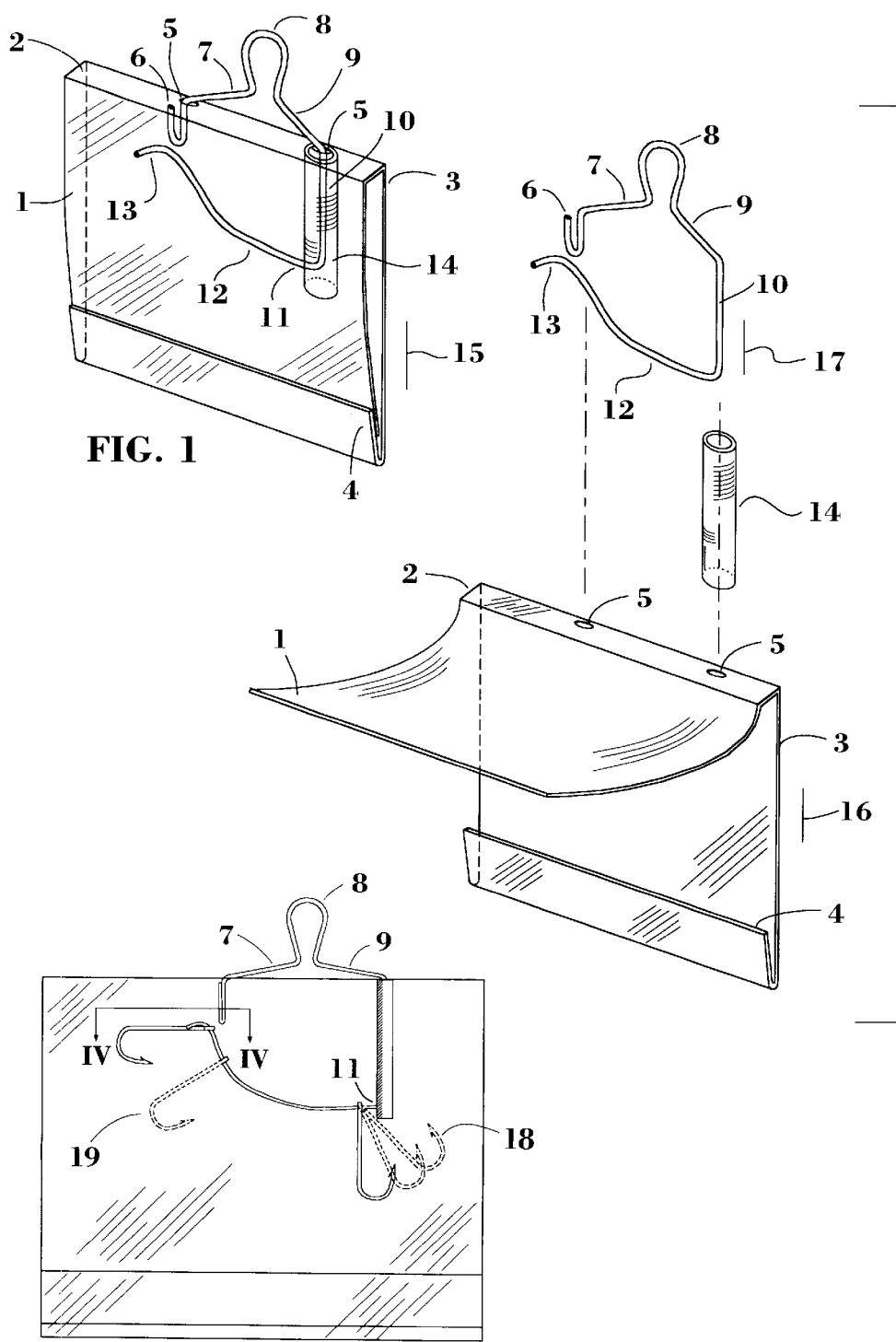
FIG. 1 is a perspective view of the fish hook dispenser.
FIG. 2 is an exploded view showing the three individual structural components of the apparatus.
FIG. 3 is a front view of the apparatus showing examples of the various features of the apparatus relative to the positions of fish hooks stored thereupon.

Now turning to the drawings, wherein identical components and features throughout are referenced utlizing a consistent system of numerals, a fish hook dispenser is illustrated in FIG. 1, and generally designated by reference number 15.

The components of the invention are shown in the exploded view of FIG. 2, illustrating how the invention consists of retainer/dispenser component 17, which is routed through and wrapped by semi-rigid clear polyvinyl plastic cover 16, and closed terminus limit stop component 14.

Figure 4:
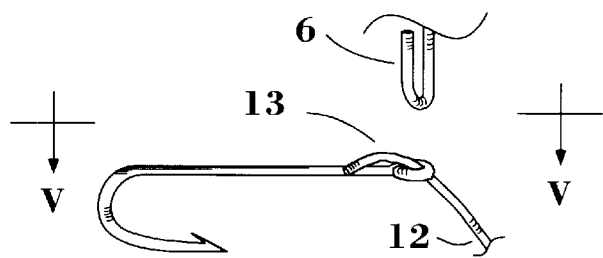
FIG. 4 is a magnified partial front view.
Figure 5:
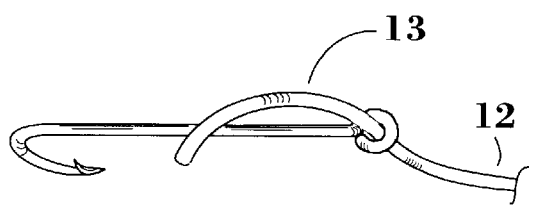
FIG. 5 a magnified partial top plan view of the apparatus, both of which show from the described directions the open terminus limit stop with a fish hook shown in a captive position.

Each hook to be stored on the device is threaded in the manner shown in FIG. 4 onto a retainer/dispenser component 17 utilizing the circular eyelet of each hook, an example of which is presented by reference number 19. The retainer/dispenser component, formed of a continuous length of wire, is shaped through bending to incorporate numerous functional features. This retainer/dispenser component consists of clasp hook 6; a slightly ascending shoulder 7; leading to a garment interface structure 8, generally consisting of a loop by which the apparatus may be hung from a button, lanyard, or similar mechanism; a slightly descending shoulder 9; a vertical segment 10 over which the closed terminus limit stop component 14 is routed; and storage arm 12, the end of which constitutes the open terminus of the component which is formed through the use of compound curves into open terminus limit stop 13. The eyelets of hooks are threaded onto, and removed from, the device at the point of the open terminus. Referring now to FIG. 3, when a hook or hooks are stored on the apparatus, and the apparatus is suspended by garment interface structure 8, the force of gravity acting upon the fish hook(s) 18 causes them to slide away from the open terminus of the retainer mechanism and toward the closed terminus, and to nest together against the closed terminus limit stop 11. When the apparatus is tilted in the direction of the open terminus, the compound curves of open terminus limit stop 13 act as a catch to the shank structure of a hook, or the first of a plurality of hooks, as shown in FIG. 4 and FIG. 5, thus preventing their escape as long as the hooks are prevented from rotating around the axis of storage arm 12 by front panel 1 and rear panel 3 of the vinyl cover. Thus, the limit stops 11 and 13 effectively constrains the free travel of the hook such that it remains at all times upon storage arm 12 until intentionally removed.

The vinyl cover consists of front panel 1, spacing element 2, rear panel 3, and retainer tab 4 into which front panel 1 may be inserted. The front and rear panels provide a basic cover for the hooks, while spacing element 2 which joins the front and rear panels also functions to separate these panels by the diameter of the closed terminus limit stop component 14. This feature also enables the free circulation of air through the apparatus. Spacing element 2, which can be heat or cold formed into the vinyl stock used to construct the vinyl cover, incorporates on interface mechanism 5 through which the retainer/dispenser component is inserted during assembly of the apparatus. Once integrated in the manner shown in FIG. 3, with the closed terminus limit stop component 14 installed, small forces, resulting from low magnitude tension strain of the descending shoulder 9 -vertical segment 10 juncture, and an opposing compression stress within the closed terminus limit stop component 14, are applied from opposite directions to the spacing element 2, which contributes to the structural rigidity to the apparatus.

The vinyl cover counteracts the tendency for the hooks to rotate on the axis of storage arm 12 of the retainer/dispenser component. This function is enhanced by the insertion of front panel 1 into retainer tab 4. Closed terminus limit stop 11 prevents the hooks from swinging around the bend of the closed end of the retainer/dispenser component as the orientation of the overall mechanism is shifted during normal handling. Closed terminus limit stop 11 consists of the mechanical interface between storage arm 12 and closed terminus limit stop component 14. The closed terminus limit stop component 14 consists of a predetermined length of flexible vinyl tubing, of a length slightly greater than vertical segment 10. This tube incorporates a short slit which permits storage arm 11 to penetrate the tube, which in turn allows the tube to hang a predetermined distance below the storage arm and act as a fulcrum against which the shank of fish hooks are forced to rotate when the apparatus is tilted in the direction of the closed terminus. This forces the eyelet of the fish hook up the storage arm and away from the closed terminus point, thus effectively shortening the shank length of the hook relative to the bend joining vertical segment 10 and storage arm 12, where the eyelet would otherwise rotate if left unconstrained. This permits the width of the vinyl cover 16 to be minimized relative to any hook of given shank length, and permits the construction of an apparatus of practical width while preventing the protrusion of fish hook points from the vinyl cover. The slightly greater length of closed terminus limit stop component 14 relative to vertical segment 10 results in the slight compression of the vinyl tube against spacing element 3, contributing to the aforementioned structural rigidity of the apparatus.

Figure 6:
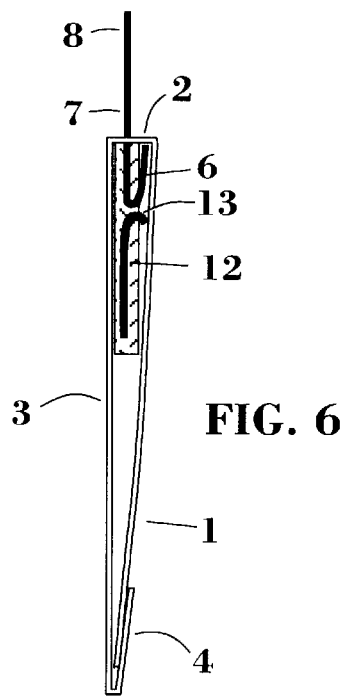
FIG. 6 is a side elevational view from the open terminus edge of the apparatus, showing how the front cover of the device interacts with the open terminus limit stop of the retainer/dispenser component to enable the functionality of the limit stop feature, and the effect of the closed terminus limit stop component as a spacer within the structure of the apparatus.
Figure 7:
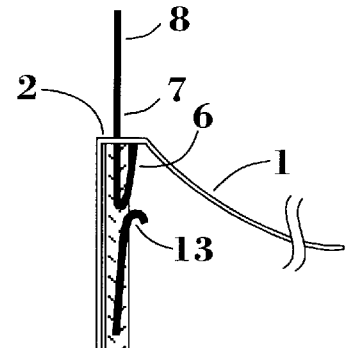
FIG. 7 is a side elevational view showing how the captive feature of the open terminus limit stop may be overridden by a user intending to remove a fish hook from the device by lifting the front panel of the apparatus cover.

Open terminus limit stop 13 functions to prevent the inadvertent escape of fish hooks of predetermined eyelet diameter when the front panel is closed as in FIG. 6 but alternately facilitates the removal of hooks when such is the intention of the user. In this case, as shown in FIG. 7, the user lifts front panel 1, grasps the shank of the hook as described below, and rotates the hook off of the storage arm.

Even with no hooks stored upon it, the center of mass of the apparatus is low. This causes it to hang level when suspended from garment interface structure 8 designated for this purpose on the retainer/dispenser component. Because the apparatus is intended to be suspended from this single point as it is being worn external to a person, and owing to the center of gravity of the apparatus, normal body motions of the person, such as leaning forward or to the side, causes the apparatus to remain in a substantially vertical orientation, enabling the hooks to remain between limit stops 11 and 13 by simple force of gravity. Thus, the apparatus may be worn with the storage arm in a "ready" or "open" state, that is, not attached to clasp hook 6, with virtually no risk of hooks inadvertently escaping. Should the apparatus be tilted towards either end, or even continuously rotated, the points of the hooks will not be exposed, nor are hooks capable of accidental escape. A user wishing to obtain a hook from the apparatus simply needs to grasp the shank of a hook, or the first fish hook of a plurality of hooks, generally between the thumb and any finger of the same hand, then slide the hook in the direction of the open terminus of the retainer/dispenser component. At the point at which slight resistance from the open limit stop is encountered, simple pronation of the wrist results of the freeing of the hook, already grasped in an orientation acceptable for tying to the line. Another useful feature of the apparatus is the gap maintained between the front and rear panels as a combined result of separation element 2 and the physical structure of the closed terminus limit stop component, as shown in FIG. 6. This gap allows the natural airflow of the ambient atmosphere to reach the hooks. This natural airflow may combine with exposure to sunlight when a clear vinyl plastic cover is used to aid in the drying of wet hooks on the apparatus, and prevents the entrapment of potentially damaging moisture following use and rinsing.

In accordance with our invention, we claim:

1. An apparatus adapted for the storage, retention, and dispensing of at least one fish hook, prior to and independent of the threading through of the eyelet of the fish hook with a fishing line for the purpose of fishing, comprising:

A folded and formed semi-rigid cover consisting of a front panel, a formed spacing element, a rear panel, and a retainer tab into which the front panel may be inserted;

A retainer/dispenser component incorporating a storage arm which utilizes the eyelet of a fish hook and the force of gravity as the primary mechanism of retention;

A plurality of limit stops upon said storage arm to constrain the free travel of a fish hook upon said storage arm, one of said plurality of limit stops forming the open terminus of said storage arm, and another of said plurality of limit stops comprised of a structural obstruction created by a closed terminus limit stop component at the closed terminus of said storage arm;

An garment interface structure for attaching said retainer/dispenser component to an outer garment utilizing a button on the garment;

A gap between said front panel and said rear panel maintained by said spacing element and said closed terminus limit stop to permit natural air circulation through the apparatus.

* * * * *